United States Patent
Kim (10) Patent No.: US 11,884,125 B2
(45) Date of Patent: Jan. 30, 2024

(54) AIR VENTILATOR FOR AUTOMOBILE

(71) Applicant: NIFCO KOREA INC., Asan-si (KR)

(72) Inventor: Seong Keon Kim, Gyeonggi-do (KR)

(73) Assignee: NIFCO KOREA INC., Asan-si (KR)

( * ) Notice: Subject to any disclaimer, the term of this patent is extended or adjusted under 35 U.S.C. 154(b) by 906 days.

(21) Appl. No.: 16/637,186

(22) PCT Filed: Aug. 7, 2018

(86) PCT No.: PCT/KR2018/008970
§ 371 (c)(1),
(2) Date: Feb. 6, 2020

(87) PCT Pub. No.: WO2019/031819
PCT Pub. Date: Feb. 14, 2019

(65) Prior Publication Data
US 2020/0231022 A1    Jul. 23, 2020

(30) Foreign Application Priority Data
Aug. 11, 2017  (KR) ........................ 10-2017-0102521

(51) Int. Cl.
*B60H 1/00* (2006.01)
*B60H 1/34* (2006.01)

(52) U.S. Cl.
CPC ..... *B60H 1/00864* (2013.01); *B60H 1/00457* (2013.01); *B60H 1/00671* (2013.01);
(Continued)

(58) Field of Classification Search
CPC ............ B60H 1/00864; B60H 1/00457; B60H 1/00671; B60H 1/00857; B60H 1/3421;
(Continued)

(56) References Cited

U.S. PATENT DOCUMENTS

| | | |
|---|---|---|
| 9,434,238 B2 | 9/2016 | Kober et al. |
| 9,902,237 B2 | 2/2018 | Sano et al. |

(Continued)

FOREIGN PATENT DOCUMENTS

| | | |
|---|---|---|
| CN | 101650067 A | 2/2010 |
| CN | 104520124 A | 4/2015 |

(Continued)

OTHER PUBLICATIONS

International Search Report for European Patent No. 3665023 dated Dec. 18, 2020.
(Continued)

*Primary Examiner* — Steven B McAllister
*Assistant Examiner* — Charles R Brawner
(74) *Attorney, Agent, or Firm* — Thomas | Horstemeyer, LLP (57) ABSTRACT

The present disclosure relates to an air ventilator for an automobile, comprising: a housing (100) comprising a flow path (110) through which air is blown; a wind direction control unit (200) comprising a louver (210) to adjust a wind direction of the air; a function carrier (300) installed in the wind direction control unit (200); a shaft (400) comprising a coupling portion (410) formed on first side portion of the shaft (400), wherein the function carrier (300) is mounted on the coupling portion (410) such that the function carrier (300) is rotatable, and an output bevel gear (420) formed on a second side portion of the shaft (400); and a pair of dampers (500) coupled to a hinge (600) so as to be foldable, wherein each of the pair of dampers (500) comprises an input bevel gear (510) to be engaged with the output bevel gear (420).

4 Claims, 6 Drawing Sheets

(52) U.S. Cl.
CPC ....... *B60H 1/00857* (2013.01); *B60H 1/3421* (2013.01); *B60H 2001/3464* (2013.01); *B60H 2001/3478* (2013.01)

(58) Field of Classification Search
CPC .. B60H 1/3464; B60H 1/3478; B60H 1/3442; B60H 1/3435; B60H 2001/3492; F24F 13/10
USPC ......................................................... 454/152
See application file for complete search history.

(56) References Cited

U.S. PATENT DOCUMENTS

| | | | |
|---|---|---|---|
| 9,963,016 | B2 | 5/2018 | Uehara et al. |
| 10,112,459 | B2 | 10/2018 | Inagaki et al. |
| 10,220,683 | B2 | 3/2019 | Sano |
| 10,317,107 | B2 | 6/2019 | Nemoto |
| 2001/0027814 | A1* | 10/2001 | Stone ................ F16K 17/383 137/601.12 |
| 2013/0210333 | A1 | 8/2013 | Kober et al. |
| 2014/0011436 | A1 | 1/2014 | Kaneda et al. |
| 2015/0202946 | A1 | 7/2015 | Inagaki et al. |
| 2015/0336445 | A1 | 11/2015 | Uehara et al. |
| 2016/0089959 | A1* | 3/2016 | Bouldron ................ F24F 13/10 454/155 |
| 2016/0102884 | A1 | 4/2016 | Terai et al. |
| 2016/0137034 | A1 | 5/2016 | Sano et al. |
| 2016/0282008 | A1 | 9/2016 | Nemoto |
| 2017/0057328 | A1* | 3/2017 | Sano .................... B60H 1/3442 |

FOREIGN PATENT DOCUMENTS

| | | | | |
|---|---|---|---|---|
| CN | 105599568 | A | | 5/2016 |
| CN | 106394170 | A | | 2/2017 |
| CN | 106476571 | A | | 3/2017 |
| DE | 102009009241 | A1 | * 8/2010 | ........... B60H 1/3442 |
| DE | 102009009241 | A1 | | 8/2010 |
| DE | 102015006382 | A1 | | 11/2015 |
| DE | 102016003974 | A1 | | 9/2016 |
| EP | 1743790 | A1 | | 1/2007 |
| JP | 2014-034280 | A | | 2/2014 |
| JP | 2016-159721 | A | | 9/2016 |
| KR | 10-2015-0130276 | A | | 11/2015 |
| WO | 2019/031819 | A1 | | 2/2019 |

OTHER PUBLICATIONS

International Search Report for PCT/KR2018/008970 dated Nov. 20, 2018.
Chinese Office Action for Chinese Patent No. 201880052152.2 dated Sep. 20, 2022.
First Examination Report for European Patent No. 18844630.6 dated Oct. 7, 2022.

* cited by examiner

AIR VENTILATOR FOR AUTOMOBILE

TECHNICAL FIELD

This application is based upon and claims the benefit of priority from KR Patent Application No. 10-2017-0102521, filed on Aug. 11, 2017, the entire contents of which are incorporated herein by reference.

The present disclosure relates to an air ventilator for an automobile ("automobile air ventilator"), and more particularly, to an automobile air ventilator that is installed in an air vent hole such that an occupant in a cabin of an automobile can control a wind direction and a flow rate of cool or warm air flowing into the cabin of the automobile through a duct.

BACKGROUND ART

In general, an automobile is equipped with an air conditioning system that adjusts the temperature within the cabin of the automobile according to the season. The cool or warm air generated in the air conditioning system flows into an air vent hole provided in an instrument panel within the cabin of the automobile through a duct, and is discharged to the inside of the cabin of the automobile.

Here, an air ventilator for controlling the wind direction of the air is provided in the air vent hole, and the wind direction is changed by rotating the direction of a louver provided in the air ventilator.

The air ventilator includes a housing, vertical louvers, horizontal louvers, and a damper.

A flow path in which air flows is formed inside the housing, and a rear panel is provided on a rear side of the housing.

In addition, a control knob is provided to slide along any one of the horizontal louvers, and the directions of the vertical louvers and the horizontal louvers are adjusted by operation of the control knob.

In addition, a damper for opening and closing an air blowing port is provided in front of the louvers. The damper is connected to a damper control knob which is separately installed, and selectively opens and closes the air blowing port according to the operation of the damper control knob.

However, the air ventilator according to the prior art has problems in that, since it is necessary to separately install the control knob for controlling the vertical and horizontal louvers and the damper control knob for controlling the damper in the housing, the number of components is increased when manufacturing the air ventilator, which causes assemblability and operability to be degraded.

PRIOR ART DOCUMENT

Patent Document

Korean Patent Publication No. 10-2015-0130276 (published on Nov. 23, 2015)

DISCLOSURE OF INVENTION

Technical Problem

An object of the present disclosure is to provide an automobile air ventilator in which the wind direction and the air flow rate of cool or warm air flowing into the cabin of the automobile through a flow path in a housing can be controlled by a single operation knob, so that the number of components is reduced when the air ventilator is manufactured and so that assemblability and operability can be improved.

Solution to Problem

In order to solve the problem described above, an automobile air ventilator of the present disclosure includes: a housing 100 comprising a flow path 110 which is formed through the housing 100 through which air is blown; a wind direction control unit 200 comprising a radially formed louver 210 to adjust a wind direction of the air supplied through the flow path 110; a function carrier 300 fixedly installed in a central rear portion of the wind direction control unit 200; a shaft 400 comprising a spherical coupling portion 410 formed on a first side portion of the shaft 400, wherein the function carrier 300 is mounted on the coupling portion 410 such that the function carrier 300 is rotatable upwards, downwards, leftwards, and rightwards, and an output bevel gear 420 formed on a second side portion of the shaft 400; and a pair of dampers 500 coupled to a hinge 600 so as to be foldable, wherein each of the pair of dampers (500) comprises an input bevel gear 510 to be engaged with the output bevel gear 420.

An operation lever 700 may be coupled to and protrude from the front face of the wind direction control unit 200, so that an occupant in the cabin of the automobile is capable of holding the operation lever 700 by a hand. Thus, when a force is applied in up, down, left, and right directions in the state in which the operation lever 700 is held by hand, the wind direction is controlled by being changed in the up, down, left and right directions through the function carrier 300 coupled to the spherical coupling portion 410 according to the force application direction.

A rail groove 411 may be formed in the coupling portion 410, and an insertion protrusion 330 inserted into the rail groove 411 may protrude from an inner portion of the function carrier 300. Thus, the shaft 400 is rotated in one direction or the other direction depending on the direction of the force applied to the operation lever 700 provided on the front face of the wind direction control unit 200. The function carrier 300 is fixedly installed to the center rear portion of the wind direction control unit 200. And, the input bevel gear 510 is rotated in the state of being engaged with the output bevel gear 420 by the amount of rotation transmitted from the output bevel gear 420 depending on the direction in which the shaft 400 is rotated, so that the dampers 500 are rotated around the hinge, thereby opening and closing the flow path 110 in the housing 100.

The air ventilator may further comprise a support pin 800 that is provided to penetrate the second side portion of the shaft 400; and a contact plate 900 that is formed inside the flow path 110, wherein the support pin 800 is in contact with the contact plate. This prevents the shaft 400 from being rotated in one direction or the other direction beyond a predetermined value, so that this enables an occupant in the cabin of the automobile to determine the opened or closed state of the flow path 110 in a sensible manner when the occupant tries to open or close the flow path 110 in the housing 100 by applying a force to the operation lever 700.

A connection pin 610 may protrude from the hinge 600, and an insertion groove 430 into which the connection pin 610 is inserted may be formed at a center of an end portion of the second side portion of the shaft 400. Thus, the hinge 600 connecting the pair of dampers 500 to the center of the second side portion of the shaft 400 is coupled to a correct position.

The function carrier 300 may comprise a first function carrier portion 310 and a second function carrier portion 320 that are dividedly formed and assembled together. Thus, the assembly of the function carrier 300 to the coupling portion 410 formed on the first side portion of the shaft 400 is facilitated.

Advantageous Effects of Invention

According to the present disclosure, a damper that is configured to open and close a flow path in a housing and a wind direction control unit that has a radially formed louver to control a wind direction of cool or warm air supplied through the flow path are integrally connected to a shaft to be individually operable; and the wind direction and the wind speed are controlled by operating the wind direction control unit and the dampers connected to the shaft by using a single operation lever. Therefore, it is possible to reduce manufacturing costs since the number of components is reduced to improve the assemblability when the air damper is manufactured, and to improve operability, thereby improving marketability.

BEST MODE FOR CARRYING OUT THE INVENTION

Hereinafter, a technical configuration of the present disclosure will be described in detail with reference to the accompanying drawings.

Figure 1:
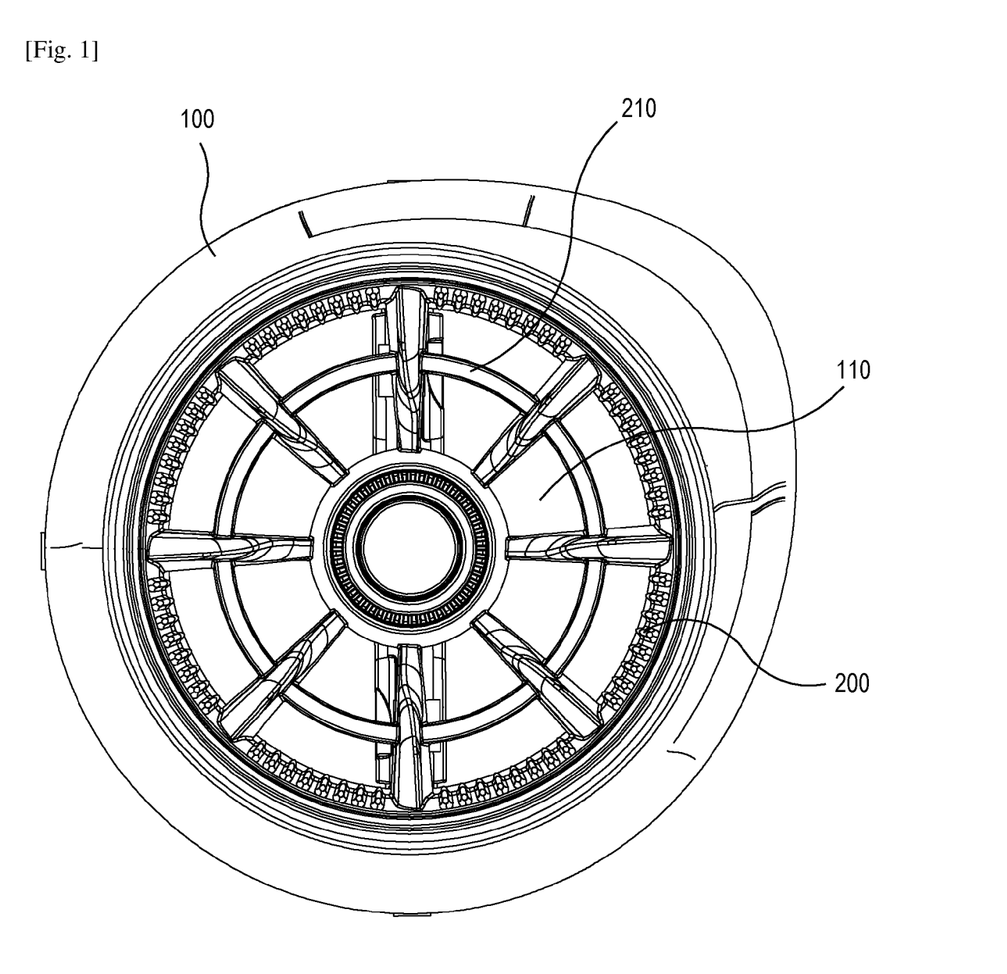
FIG. 1 is a front view illustrating an automobile air ventilator according to the present disclosure.
Figure 2:
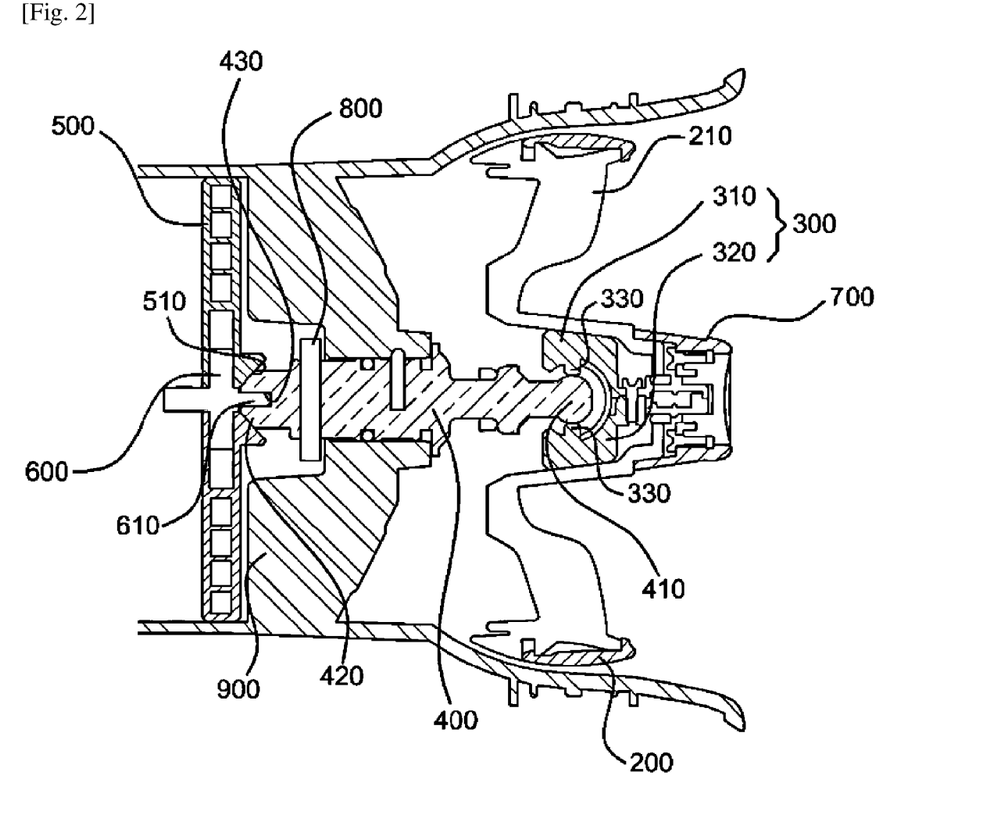
FIG. 2 is a sectional view that schematically illustrates the configuration of the automobile air ventilator according to the present disclosure.
Figure 3:
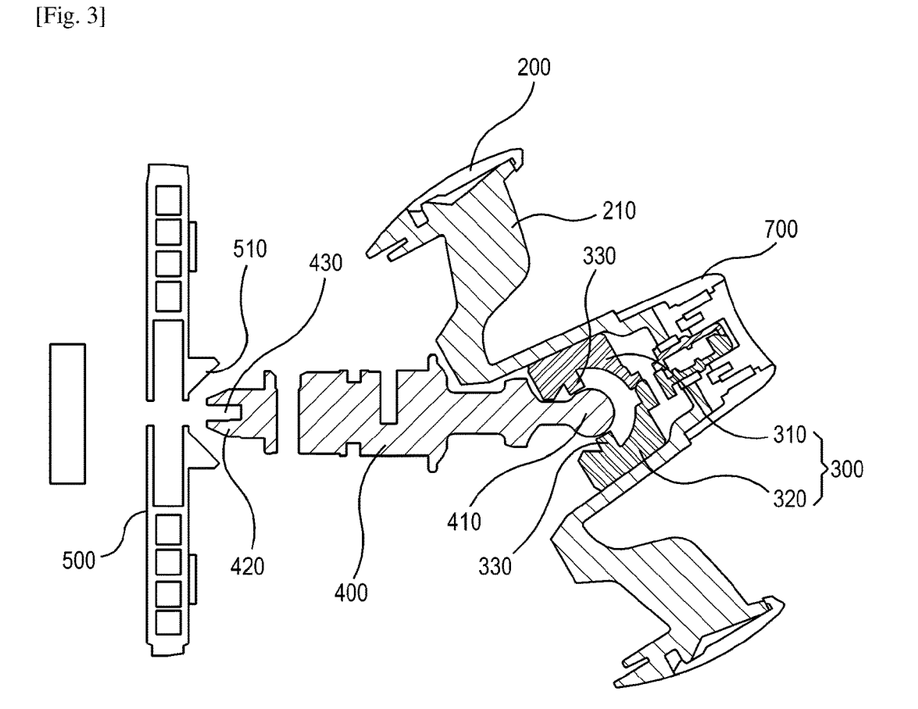
FIG. 3 is a sectional view that schematically illustrates a state in which a wind direction control unit of the automobile air ventilator according to the present disclosure is moved upward.
Figure 4:
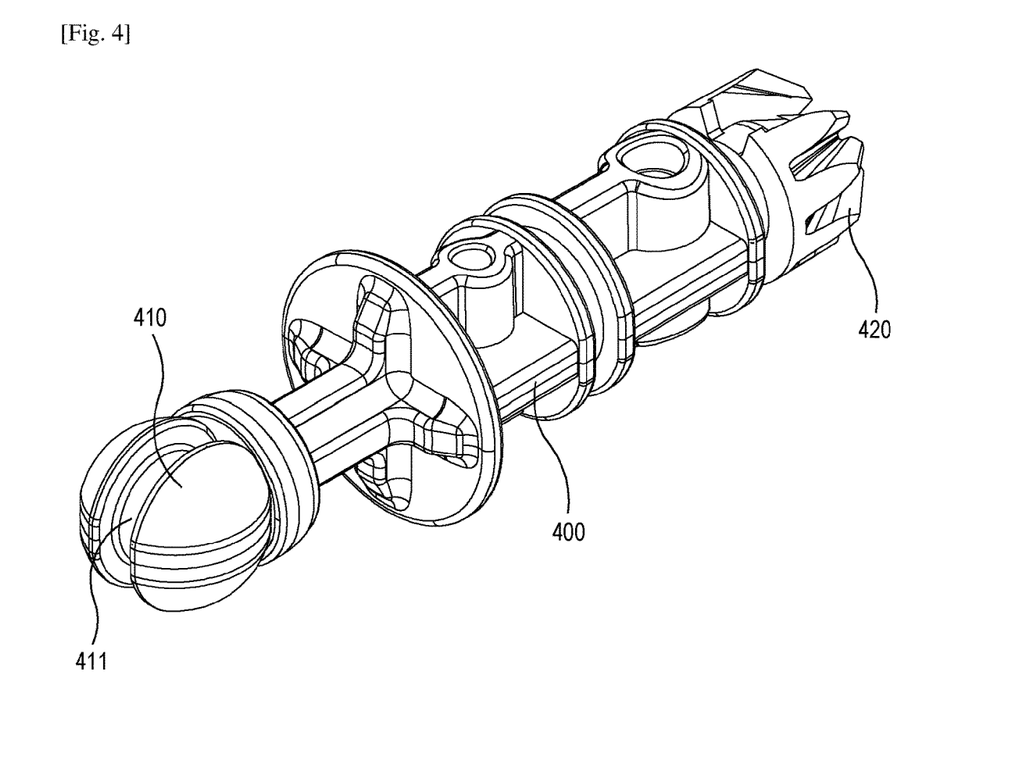
FIG. 4 is a perspective view illustrating a shaft of the automobile air ventilator according to the present disclosure.
Figure 5:
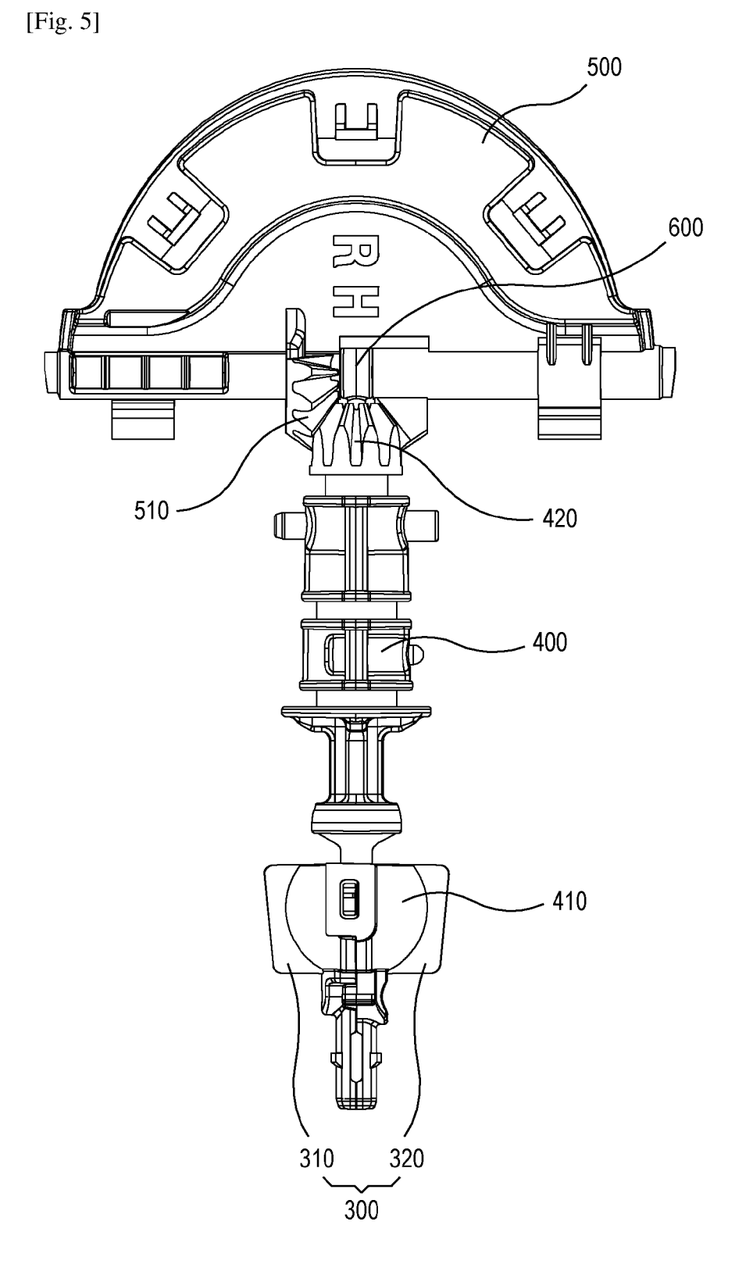
FIG. 5 is a coupled state view illustrating a state where a damper and a function carrier of the automobile air ventilator according to the present disclosure are coupled to the shaft.
Figure 6:
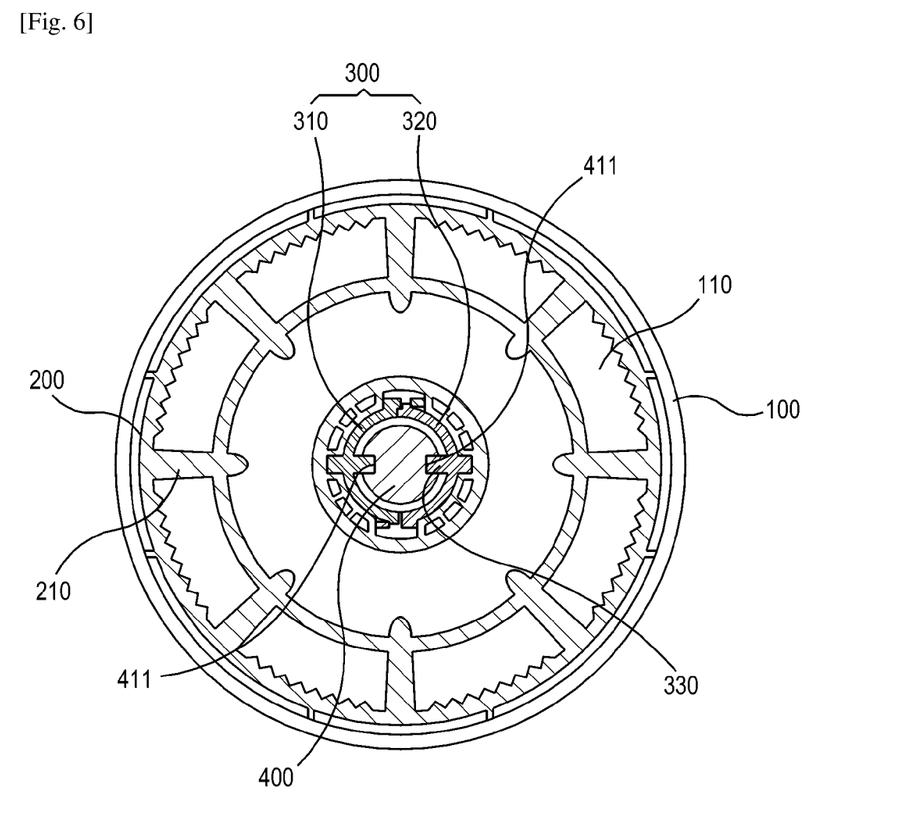
FIG. 6 is a sectional view illustrating a state where the shaft, the function carrier, and the wind direction control unit of the automobile air ventilator according to the present disclosure are installed in a housing.
Figure 7:
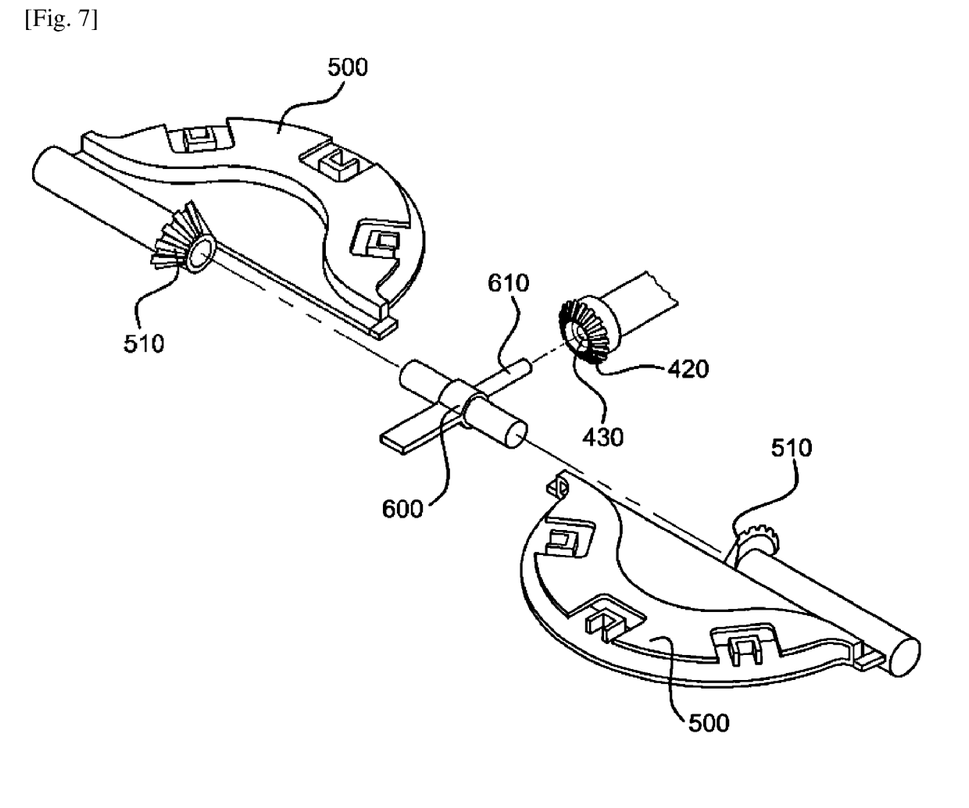
FIG. 7 is an exploded perspective view illustrating a state in which a pair of dampers are coupled to a shaft according to the present disclosure.

FIG. 1 is a front view that illustrates an automobile air ventilator according to the present disclosure, FIG. 2 is a sectional view that schematically illustrates the configuration of the automobile air ventilator according to the present disclosure, FIG. 3 is a sectional view that schematically illustrates a state in which an wind direction control unit of the automobile air ventilator according to the present disclosure is moved upward, FIG. 4 is a perspective view illustrating a shaft of the automobile air ventilator according to the present disclosure, FIG. 5 is a coupled state view illustrating a state where a damper and a function carrier of the automobile air ventilator according to the present disclosure are coupled to the shaft, FIG. 6 is a sectional view illustrating a state where the shaft, the function carrier, and the wind direction control unit of the automobile air ventilator according to the present disclosure are installed in a housing, and FIG. 7 is an exploded perspective view illustrating a state in which a pair of dampers are coupled to a shaft according to the present disclosure.

As illustrated in FIGS. 1 to 7, an automobile air ventilator of present disclosure includes a housing 100 having a flow path 110 formed therethrough. Air is blown through the flow path 110. The automobile air ventilator further includes: a wind direction control unit 200 having a radially formed louver 210 to adjust the wind direction of cool or warm air supplied through the flow path 110; a function carrier 300 fixedly installed in a center rear portion of the wind direction control unit 200; and a shaft 400 having a spherical coupling portion 410 and an output bevel gear 420. The coupling portion 410 is formed on first side portion of the shaft 400. The function carrier 300 is mounted on the coupling portion 410 such that the function carrier 300 is rotatable up, down, left, and right. And the output bevel gear 420 is formed on a second side portion of shaft 400. The automobile air ventilator further includes a pair of dampers 500 coupled to a hinge 600 so as to be foldable. Each of the pair of dampers 500 has an input bevel gear 510 to be engaged with the output bevel gear 420 of the shaft 400.

In addition, an operation lever 700 is coupled to the front face of the wind direction control unit 200. The operation lever 700 protrudes from the front face of the wind direction control unit 200. An occupant in the cabin of the automobile can hold the operation lever 700 by hand.

As illustrated in FIGS. 4 and 6, rail grooves 411 are formed in the coupling portion 410 formed on the first side portion of the shaft 400. And an insertion protrusion 330 inserted into the rail grooves 411 are formed on the inner portion of the function carrier 300. The insertion protrusion 330 protrudes from the inner portion of the function carrier 300.

In addition, a support pin 800 is provided to penetrate the second side portion of the shaft 400. And a contact plate 900 is formed inside the flow path 110 of the housing 100. The contact plate 900 may be integrally formed. The contact plate 900 may be fixed to the housing 100. The contact plate 900 may be integrally formed with the housing 100. The support pin 800 is in contact with the contact plate.

In addition, as illustrated in FIG. 7, a connection pin 610 is formed on the hinge 600 to which the pair of dampers 500 are rotatably coupled. The connection pin 610 protrudes from the hinge 600. And the connection pin 610 is inserted into an insertion groove 430. The insertion groove 430 is formed at a center of an end portion of the second side portion of the shaft 400 on which the output bevel gear 420 is formed.

In addition, the function carrier 300 is divided into a first function carrier portion 310 and a second function carrier portion 320, which are capable of being connected to each other. The first function carrier portion 310 and the second function carrier portion 320 are dividedly formed and assembled together.

In the present disclosure configured as described above, the function carrier 300 is rotatably installed by coupling the first function carrier portion 310 and the second function carrier portion 320 to the coupling portion 410 formed on the first side portion of the shaft 400. The first function carrier portion 310 and the second function carrier portion 320 are coupled to each other.

In this configuration, the insertion protrusions 330 protruding from the inner portions of the first function carrier portion 310 and the second function carrier portion 320 are maintained as being inserted into the rail grooves 411 formed in the coupling portion 410.

In addition, the center rear portion of the wind direction control unit 200 is fixedly coupled to the function carrier 300 installed in the coupling portion 410. The operation lever 700 is coupled to and protrudes from the front face of the wind direction control unit 200.

Therefore, when a force is applied in the up, down, left, or right direction in the state in which the operation lever 700 is held by hand, the wind direction control unit 200 is rotated along the coupling portion 410 so that the wind direction control unit 200 is moved in the direction of the force applied to the operation lever 700 (for example, the up, down, left, or right direction).

In addition, each of the input bevel gears 510 of the dampers 500 which are foldably coupled to the hinge 600 are engaged with the output bevel gear 420. The output bevel gear 420 is provided on the second side portion of the shaft 400, on the first side portion of which the wind direction control unit 200 is provided so as to be movable up, down, left, and right.

Due to this, when the input bevel gear 510 is rotated by rotating the shaft 400 in one direction and the other direction, the output bevel gear 420 is rotated, so that the dampers 500 are rotated around the hinge 600.

In this configuration, by inserting the connection pin 610 protruding from the hinge 600 into the insertion groove 430 formed at the center of the end portion of the second side portion of the shaft 400, the output bevel gear 420 is installed to be engaged with the input bevel gears 510. The pair of dampers 500 rotatably couples to the hinge 600.

The shaft 400, in which the wind direction control unit 200 and the dampers 500 are installed, is installed to be located at the center of the flow path 110 formed in the housing 100.

In this configuration, the support pin 800 is installed to penetrate the second side portion of the shaft 400. And the support pin 800 is installed to come into contact with the contact plate 900 which is formed inside the flow path 110 of the housing 100 so that the amount of rotation of the shaft is controlled.

Accordingly, when the occupant in the cabin of the automobile applies a force to the operation lever 700 in the up, down, left, or right direction in the state of holding the operation lever 700 by hand, the wind direction control unit 200, in which the louver 210 for controlling the wind direction of the cool or warm air supplied through the flow path 110 in the housing 100 is radially formed, is moved so as to control the wind direction.

In the case where the opening and closing amount of the flow path 110 in the housing 100 is controlled in order to control the wind speed of the cold or warm air supplied to the vehicle in the state in which the wind direction is controlled through the wind direction control unit 200 as described above, when the occupant in the cabin of the automobile applies a force to the operation lever 700 in one direction and in the other direction in the state of holding the operation lever 700 by hand, the insertion protrusion 330 protruding from the inner portion of the function carrier 300 is brought into contact with the inner wall face of the rail groove 411 formed in the coupling portion 410, thereby transmitting the force applied to the operation lever 700 to the shaft 400. In this operation, the shaft 400 is rotated in the force application direction for the operation lever 700, and the dampers 500 are rotated about the hinge 600 according to rotation of the shaft 400, thereby opening or closing the flow path of the housing 100.

Thus, an occupant in the cabin of the automobile can use the air ventilator while controlling the wind direction and wind speed of the cold or warm air supplied through the housing 100 by using the single operation lever 700.

The invention claimed is:

1. An air ventilator for an automobile, comprising:
   a housing comprising a flow path, which is formed through the housing and through which air is blown;
   a wind direction control unit comprising a louver to adjust a wind direction of the air supplied through the flow path;
   a function carrier fixedly installed in a central rear portion of the wind direction control unit;
   a shaft comprising:
      a spherical coupling portion formed on a first side portion of the shaft, wherein the function carrier is mounted on the coupling portion such that the function carrier is rotatable upwards, downwards, leftwards, and rightwards; and
      an output bevel gear formed on a second side portion of the shaft; and
   a pair of dampers coupled to a hinge so as to be foldable, wherein each of the pair of dampers comprises an input bevel gear to be engaged with the output bevel gear,
   wherein a rail groove is formed in the coupling portion,
   wherein an insertion protrusion inserted into the rail groove protrudes from an inner portion of the function carrier, and
   wherein the function carrier comprises a first function carrier portion and a second function carrier portion that are assembled together such that the first and second carrier portions are rotatably installed by directly coupling the first function carrier portion and the second function carrier portion to the coupling portion.

2. The air ventilator of claim 1, further comprising an operation lever that is coupled to and protrudes from a front face of the wind direction control unit so that a user of the automobile is capable of holding the operation lever by a hand.

3. The air ventilator of claim 1, further comprising:
   a support pin that is provided to penetrate the second side portion of the shaft; and
   a contact plate that is formed inside the flow path, wherein the support pin is in contact with the contact plate.

4. The air ventilator of claim 1, wherein a connection pin protrudes from the hinge, and an insertion groove into which the connection pin is inserted is formed at a center of an end portion of the second side portion of the shaft.

\* \* \* \* \*